Sept. 12, 1933.    A. HUNZIKER, JR    1,926,236
BUMPER ATTACHMENT
Filed Sept. 6, 1932    2 Sheets-Sheet 1
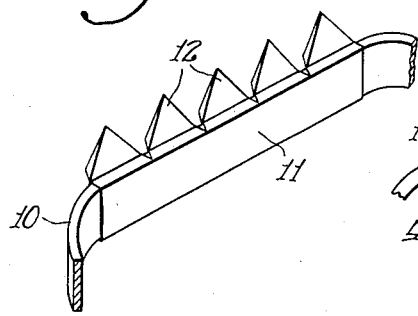
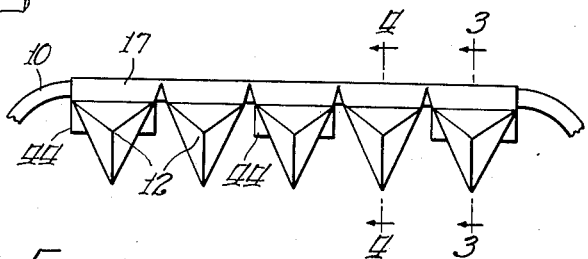
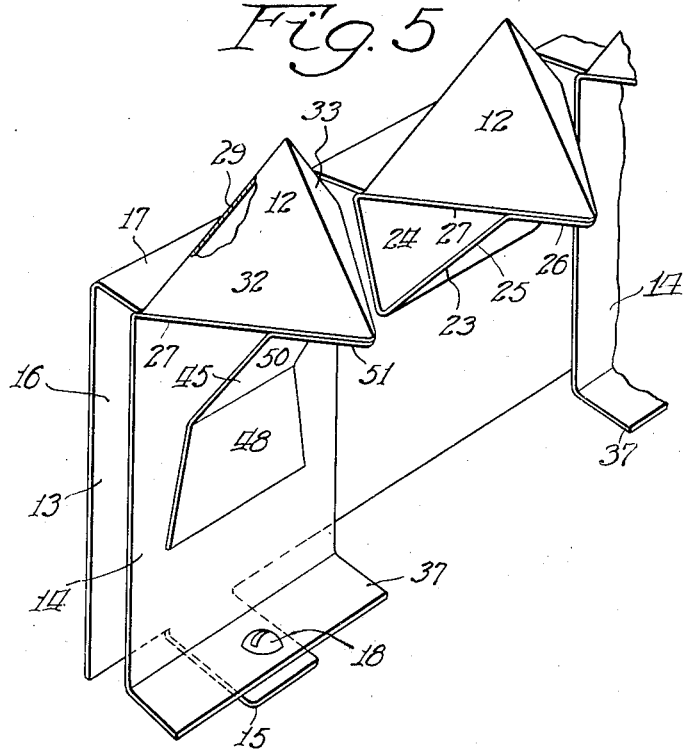
Witness:
V. Siljander
Inventor
Adolph Hunziker, Jr.
By:
Hill & Hill
Attys.

Sept. 12, 1933.   A. HUNZIKER, JR   1,926,236
BUMPER ATTACHMENT
Filed Sept. 6, 1932   2 Sheets-Sheet 2
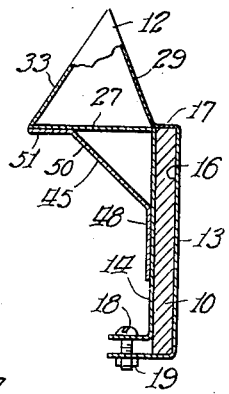
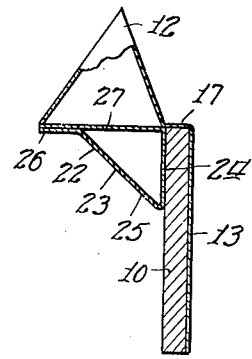
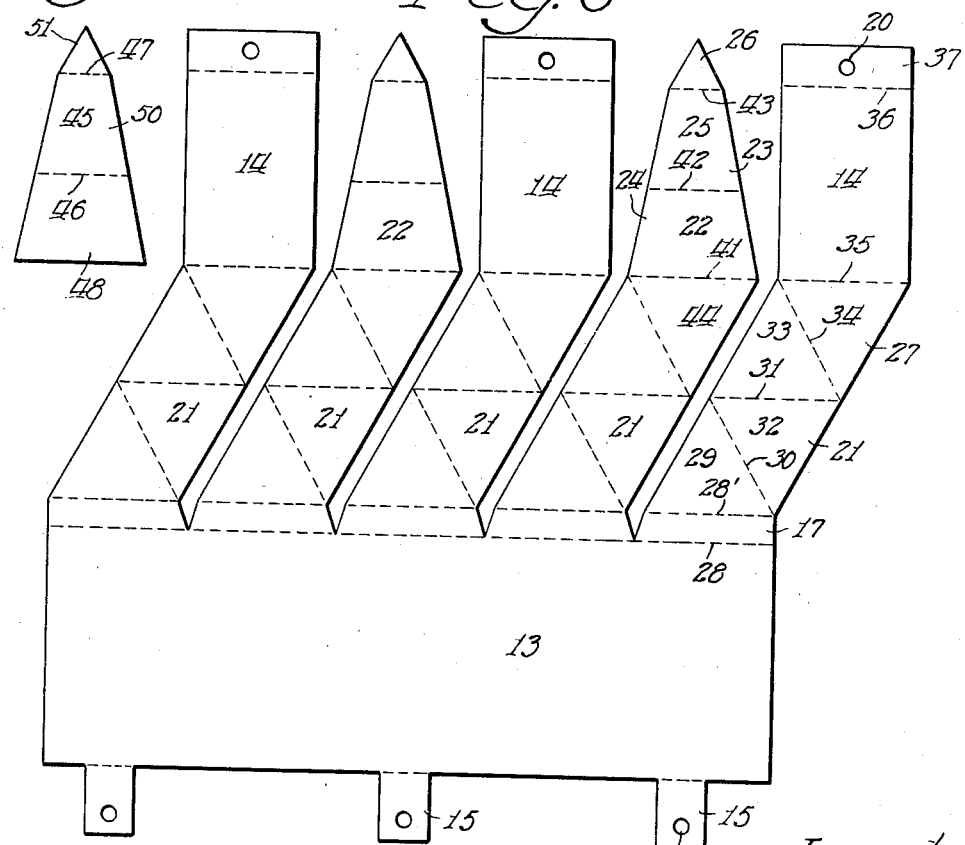
Witness:
V. Siljander
Inventor
Adolph Hunziker, Jr.
By: Hill & Hill
Attys.

Patented Sept. 12, 1933

1,926,236

UNITED STATES PATENT OFFICE 1,926,236

BUMPER ATTACHMENT

Adolph Hunziker, Jr., Chicago, Ill.

Application September 6, 1932. Serial No. 631,830

13 Claims. (Cl. 293—55)

The invention relates to improvements in automobile bumpers and has as its principal object the provsion of means for rendering the bumper inconvenient for use as a support for a person as it has been found that persons either stand or sit upon those bumpers provided to protect the rear of the car and in this manner transport themselves without authority of the driver and thus subject themselves to the possibility of injury and subject the driver to inconvenience should an accident occur to them.

It is an object of the invention to provide a bumper with prongs arranged in a manner to prohibit use of the bumper in the manner above described.

It is another object of the invention to provide a device which may be readily attached for use to accomplish the above mentioned objects.

Another object of the invention is to provide a construction capable of producing the advantages above referred to and to fashion said device from a blank, portions of which are bent in a manner to form elements capable of functioning to accomplish the above mentioned objects.

The invention has these and other objects, all of which will be explained in detail and more readily understood when read in conjunction with the accompanying drawings, it being manifest that changes and modifications may be resorted to without departing from the spirit of the appended claims forming a part hereof.

In the drawings, Fig. 1 is a perspective view of a portion of a bumper having the invention applied thereto;

Fig. 2 is a plan view of the structure shown in Fig. 1;

Figs. 3 and 4 are respectively sections taken on lines designated 3—3 and 4—4 of Fig. 2;

Fig. 5 is a perspective view of a portion of the structure shown in Figs. 1 and 2;

Fig. 6 is a plan view of a blank which may be formed to fashion the device shown in Figs. 1 to 5; and Fig. 7 is a view of a blank adapted to be fashioned to form one of the elements of the structure.

The device illustrated in the drawings is shown as applied to what is termed in the art as a bumperette which is usually employed to protect the rear of the car. The bumperette illustrated is designated 10 and the device for preventing persons from using the bumperette in the manner hereinabove referred to is generally designated 11. The device generally designated 11 is designed to be secured to the bumperette and is further designed to provide a plurality of pyramid-shaped prongs 12, it being understood that these prongs extend in a manner to prevent convenient use of the bumperette as a rest or support during attempted transportation. The device generally designated 11 is of a length substantially corresponding with the length of the bumper and provides a plate-like portion 13. In addition to the above the device is provided with a plurality of elements such as 14 which are adapted to cooperate with a face of the bumper and also with the apertured extensions 15 of the portion 13 to thereby provide for the reception of means for securing the device to an element of the bumper. The arrangement of the portions 13 and 14 produces a space 16 for the reception of a portion of the bumper and the portion 13 of the device is formed with a ledge 17 which is adapted to engage one edge of the bumper, the extensions 15 providing means for engaging the opposite edge of the bumper and cooperate with an element 37 of the portion 14 to thus hold the entire structure in rigid or fixed relation. It is understood that any convenient means may be employed for securing the elements of the structure in the manner just referred to. The means herein shown consists of a bolt 18 and a nut 19 the bolt being passed through apertures such as 20 and 21 respectively provided in the extensions 14 and the portions 15 of the structure. It is contemplated to produce the device in the most convenient manner which may be in the form of a stamping and may take the form of the blank shown in Fig. 6. This blank provides the front plate 13, the ledge 17, the portions 21 all of the latter of which may be readily bent in a manner to produce the pyramid shaped prongs 12, the elements 14 and also those elements designated 15 and 37 and other portions. The elements generally designated 14 are spaced from each other lengthwise of the plate-like member 13 and have the extensions 22 of certain of the elements 21, located in the spaces between said elements 14.

These elements 22 are bent in a manner to provide supports generally designated 23 and most clearly shown in Figs. 4 and 5. These supports are fashioned to produce the portion 24, the strut-like portion 25 and the end 26, the portion 24 being designed to engage the bumper 10 and the portion 26 being adapted to be welded or otherwise connected with a portion 27 which forms the base of its particular pyramid-shaped projection 12. All of the portions 21 of the blank are designed to be folded upon the dotted lines designated 28 and 28' to provide the ledge 17 and the wall 29 of the pyramid shaped prongs. These portions of the blank are again bent along the lines 30 and 31 which forms the wall 32 and the wall 33. The material of the wall 33 is again bent along the dotted lines 34 to provide the base 27 of the pyramids. The elements 21 are again bent at 35 which respectively thus produce the portions 14 and 22. The portion 14 is bent along the line 36 to provide the portion 37. Since all of the pyramids are formed by bending the material in the manner just described, it is believed that the explanation of the manner of forming one pyramid will suffice for an understanding of the manner of forming the remaining pyramids or prongs.

Referring to Figs. 4 and 5, it will be noted that one of the prongs shown in these figures has a portion 24 which is integral therewith and provides a wall adapted to cooperate with one face of the bumper and in addition is provided with means which forms the strut 25, the extremity of the strut such as 26 being secured to the base of this particular pyramid and thus will support this pyramid when a weight is applied thereto. This strut or support 25 is formed of an element such as 22 of one of the portions 21. The portion 22 is bent upon the line 41 and thus produces the wall 24 and is again bent at 42 so as to fashion the strut portion 25, it being understood that the portion 22 is also bent at 43 to provide the portion 26 which is secured to the portion 44 which forms the base of these prongs.

Referring now to Figs. 5 and 7, it will be noted that those prongs formed by bending the portions 21 and having the elements 22 will, when arranged in the manner previously described, provide means which cooperates with the bumper to thus support its particular prong 12. It will be further noted that certain of the pyramids or prongs formed of the elements 21 particularly those having the portions 14 extending therefrom are not formed in a manner corresponding with those elements 21 having the portions 22 and thus some means of support must be provided. This support is formed of the blank shown in Fig. 7 which produces the support 45. This blank is bent upon the lines 46 and 47 which produces the element 48 which may have one end brazed or welded or otherwise secured to the portion 14 to support these particular prongs. The blank illustrated in Fig. 7 also produces the strut-like portion 50 and the element 51 which is secured to the base of those sprongs formed of the elements 21 having the elements 14 extending therefrom and thus adds to the strength of these elements of the structure.

From the foregoing description, it is manifest that a simple arrangement is provided whereby a bumper may be provided with means for making it difficult for a person to support himself upon the bumper and thus be transported from one place to another unbeknown to the driver of the vehicle and that the device may be fashioned of a blank capable of being bent in a manner to produce the several elements for preventing a person from riding the bumper and also means whereby the device may be readily attached to bumpers now in use.

Having thus described the invention, what I claim as new and desire to cover by Letters Patent is:

1. A device adapted to be secured to an automobile bumper, said device being comprised of a blank adapted to be folded to form a plurality of faces to provide means for attaching said device to engage the edges of said bumper and having means extending from one of said faces rendering said bumper inconvenient for use as a support for a person.

2. A device adapted to be secured to an automobile bumper, said device being comprised of a blank adapted to be folded to provide means for attaching said device to said bumper, said blank being also adapted to be folded to provide prongs, said prongs providing means rendering said bumper inconvenient for use as a support for a person.

3. A device adapted to be secured to an automobile bumper, said device being comprised of a member having a row of prongs, and spaced elements adapted to be drawn together extending from said member adapted to engage the edge portions of said bumper arranged in holding relation between said elements.

4. A device adapted to be secured to an automobile bumper, said device being comprised of a member having a row of prongs, spaced elements extending laterally from said member adapted to have a portion of said bumper arranged in holding relation between said elements, and means for drawing and securing said elements together.

5. A device adapted to be secured to an automobile bumper, said device having a plurality of prongs, an element adapted to engage the edges of said bumper and spaced elements providing a bifurcation arranged laterally to said prongs for the reception of a portion of said bumper providing means for holding said devices relatively to said bumper.

6. A device adapted to be secured to an automobile bumper, said device having an element adapted to engage an edge of said bumper, prongs projecting from said element, and means for attaching said device to said bumper, said means including spaced members adapted to be drawn together and cooperate with the opposed faces and an edge of an element of said bumper.

7. A device adapted to be secured to an automobile bumper, said device comprised of a blank adapted to be folded to provide means for associating said device to said bumper, means for securing the device to said bumper, said blank also being adapted to be folded to provide prongs, and said prongs providing means rendering said bumper inconvenient for use as a support for a person.

8. A device adapted to be secured to an automobile bumper, said device being of a character to be folded to provide means for associating said device to said bumper, means for drawing said first-mentioned means together to secure the device to said bumper, said device also being adapted to be folded to provide prongs, said prongs rendering said bumper inconvenient for use as a support for a person.

9. A device adapted to be secured to an automobile bumper, said device being comprised of a blank adapted to be folded to provide means for attaching said device to said bumper and having means arranged laterally to said first-mentioned means rendering said bumper inconvenient for use as a support for a person.

10. A device adapted to be secured to an automobile bumper, said device being comprised of a blank adapted to be folded to provide means for attaching said device to said bumper, said blank also being adapted to be folded to provide prongs arranged laterally to said first-mentioned means, said prongs providing means rendering said bumper inconvenient for use as a support for a person.

11. A device adapted to be secured to an automobile bumper, said device comprised of a blank adapted to be folded to provide means for associating said device to said bumper, means for securing the device to said bumper, said blank also being adapted to be folded to provide prongs arranged laterally to said first-mentioned means, and said prongs providing means rendering said bumper inconvenient for use as a support for a person.

12. A device of the kind described comprising a blank formed to provide a plate having a set of spaced portions extending from one side thereof of a character when properly folded to provide a plurality of prongs and braces for supporting said prongs, and a second set of spaced portions providing prongs extending from said plate arranged between said first-mentioned portions and of a character to be folded into a position opposite said plate whereby said plate and said second set of portions provide means for receiving a portion of a bumper.

13. A device adapted to be secured to an automobile bumper, said device comprised of a blank adapted to be folded to provide means for associating said device to said bumper to engage an edge thereof, means for engaging the other edge of the bumper and means providing an adjustable connection between the means engaging the edges of the bumper to secure the device to said bumper, said blank also being adapted to be folded to provide a prong, said prong providing means rendering said bumper inconvenient for use as a support for a person.

ADOLPH HUNZIKER, Jr.